US007956547B2

(12) United States Patent
Maeda et al.

(10) Patent No.: US 7,956,547 B2

(45) Date of Patent: Jun. 7, 2011

(54) DIELECTRIC BARRIER DISCHARGE LAMP LIGHTING DEVICE

(75) Inventors: Syouhei Maeda, Imabari (JP); Toshiya Suzuki, Imabari (JP); Akiko Kuraya, Imabari (JP)

(73) Assignee: Harison Toshiba Lighting Corp., Imabari-shi (JP)

( * ) Notice: Subject to any disclaimer, the term of this patent is extended or adjusted under 35 U.S.C. 154(b) by 384 days.

(21) Appl. No.: 12/337,974

(22) Filed: Dec. 18, 2008

(65) Prior Publication Data

US 2009/0160340 A1 Jun. 25, 2009

(30) Foreign Application Priority Data

Dec. 25, 2007 (JP) ............................... P2007-331412

(51) Int. Cl.
*H05B 37/00* (2006.01)
*H05B 37/02* (2006.01)

(52) U.S. Cl. ......................... 315/205; 315/223; 315/291

(58) Field of Classification Search .................. 315/205, 315/219, 223, 291, 307, 362
See application file for complete search history.

(56) References Cited

U.S. PATENT DOCUMENTS 3,913,002 A * 10/1975 Steigerwald et al. ........... 363/18
4,533,987 A * 8/1985 Tomofuji et al. ............... 363/36
5,565,739 A * 10/1996 Brownell ................... 315/169.3
5,814,947 A * 9/1998 Brownell ................... 315/169.3
6,100,644 A * 8/2000 Titus ......................... 315/209 R
6,356,033 B1 * 3/2002 Okamoto et al. ......... 315/209 R
6,369,519 B1 * 4/2002 Okamoto et al. ............. 315/224
6,445,137 B1 * 9/2002 Okamoto et al. ............. 315/246
6,483,253 B1 * 11/2002 Okamoto et al. ............. 315/219
6,900,593 B2 * 5/2005 Imoto ............................ 315/72
7,312,584 B2 * 12/2007 Tamita et al. ................. 315/247

FOREIGN PATENT DOCUMENTS

JP 2005-209397 8/2005

* cited by examiner

*Primary Examiner* — Thuy Vinh Tran

(74) *Attorney, Agent, or Firm* — Oblon, Spivak, McClelland, Maier & Neustadt, L.L.P.

(57) ABSTRACT

A dielectric barrier discharge lamp (14) has an inside electrode (142) in a tube axis direction within the airtight container (141), which has ultraviolet transmission properties and a long tube shape, and an outside electrode (143) having a semicircular shape arranged outside of the airtight container (141) in close contact with it. Besides, an excimer-forming gas is sealed in the airtight container (141). AC voltage supplied from the power source (11) is converted into DC voltage through a converter (12) and outputted. A high-frequency wave is generated by an inverter (13) based on the DC voltage supplied from the converter (12), and a dielectric barrier discharge is induced in the dielectric barrier discharge lamp (14) to irradiate ultraviolet rays. The converter (12) is configured by connecting in series the outputs of DC power sources (121), (122). Optimum luminous efficiency of a dielectric barrier discharge lamp having different specifications is also realized by adjusting the number of DC power sources.

5 Claims, 10 Drawing Sheets

14
143
142
141
IL
13
Inverter
+
-
Vdc
Idc
100: High-Frequency Lighting Device
D2
D2
12: Converter
121
DC Power Source
122
DC Power Source
SW
11

14
Dielectric Barrier
Discharge Lamp
13:Inverter
12:Converter
121
122
100
11
SW
T1
La
Lb
D1
C1
D2
T2
NP1
NP2
Nb
NS
C2
R1
R2
Q1
Q2
L
a
b
c
d
e
+
-

14:Dielectric Barrier Discharge Lamp
44b
51a
LT
X
X'
54
52
143
141
142
51a
44a
50a
50b
100
HF
Lighting
Device 43b
46b
47b
49b
48
LT
45
142
141
49a
46a
47a
43a 51a
53
142
LT
54
143
141
x - x'
G
52
51b 71:Abnormality Detection Portion
12:Converter
DC Power Source
DC Power Source
121
122
D2
D2
SW
11
711
712
13
Inverter
Vdc
Idc
IL
14
143
141
142
Lighting signal/Abnormality signal (a)
(b)
(c)
(d)
(e)
ON
OFF
Vdc
[V]
Idc
[A]
IL
[A]
V1
V2
V3
V3
V4
Unlighting Detection
Unlighting Detection
Lighting Detection
Lighted State
Unlighted State
Lighted State 14
143
142
141
IL
13
Inverter
Vdc
Idc
71: Abnormality Detection Portion
711
712
713
D2
D2'
12: Converter
121
DC Power Source
122
DC Power Source
SW
11
Lighting signal/ Abnormality signal

DIELECTRIC BARRIER DISCHARGE LAMP LIGHTING DEVICE

CROSS-REFERENCE TO RELATED APPLICATIONS

This application is based upon and claims the benefit of priority from the prior Japanese Patent Application No. 2007-331412, filed on Dec. 25, 2007; the entire contents of which are incorporated herein by reference.

BACKGROUND OF THE INVENTION

1. Field of the Invention

The present invention relates to a dielectric barrier discharge lamp lighting device which turns on a dielectric barrier discharge lamp used for dry cleaning or the like, and more particularly realizes a lighting device capable of obtaining optimum luminous efficiency without newly designing a DC power source even when a dielectric barrier discharge lamp having different specifications is used.

2. Description of the Related Art

A dielectric barrier discharge lamp used for dry cleaning of a liquid crystal substrate or the like according to JP-A 2005-209397 (KOKAI) (Reference 1) applies a high frequency voltage to an excimer lamp, which has an excimer-forming gas sealed within a quartz glass tube, to cause a discharge within the quartz glass tube so as to put the excimer-forming gas in an excimer state, and emits light having a wavelength of 172 nm per unit wavelength to decompose oxygen in the atmosphere so as to generate active oxygen. And, the organic compound having its bonding cut off reacts with the active oxygen to produce carbon dioxide, water and the like, thereby enabling to remove the organic compound.

BRIEF SUMMARY OF THE INVENTION

The dielectric barrier discharge lamp according to the technology of the reference 1 must be turned on at high voltage and high frequency. In order to provide the dielectric barrier discharge lamp with optimum luminous efficiency even if a dielectric barrier discharge lamp having different specifications is used, it is necessary to change the specifications of the transformer of the inverter. To meet the above, it is necessary to redesign the DC power source to an optimum one together with the inverter every time a dielectric barrier discharge lamp having different specifications is used. Therefore, the method of the reference that a different power source is provided depending on individual lamp specifications takes a long lead time and cannot timely meet the market demands. Thus, it has disadvantages that maintainability after delivery is degraded and the cost is increased.

According to an aspect of the present invention, there is provided optimum luminous efficiency without newly designing a DC power source even when a dielectric barrier discharge lamp having different specifications is used.

DETAILED DESCRIPTION

The best mode of carrying out the present invention will be described below in detail with reference to the drawings.

Figure 1:
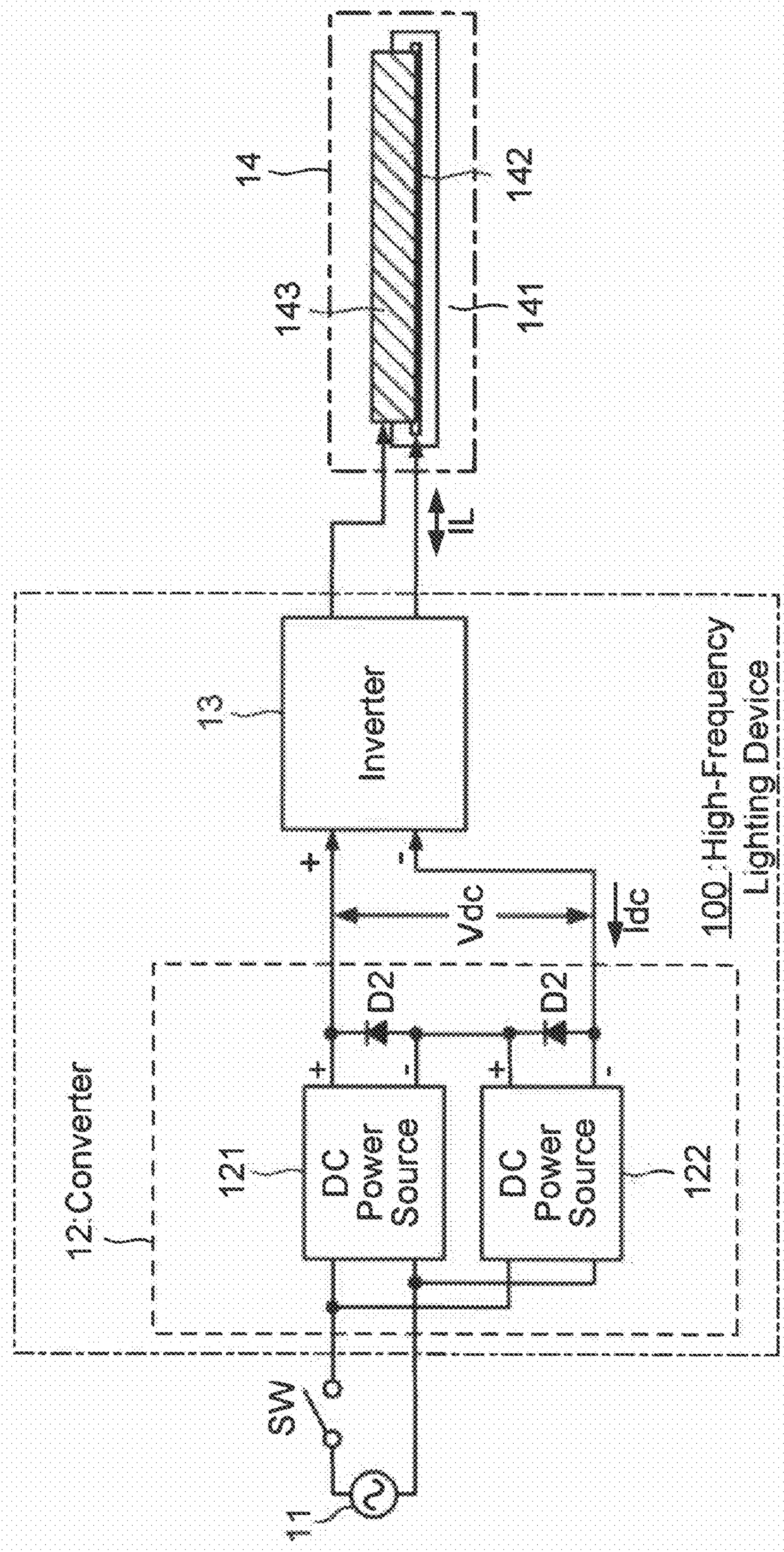
FIG. 1 is a conceptual configuration view for explaining a first embodiment of a dielectric barrier discharge lamp lighting device of the invention.

FIG. 1 is a conceptual configuration view for explaining a first embodiment of a dielectric barrier discharge lamp lighting device of the invention.

In FIG. 1, an AC voltage supplied from a commercial power source 11 is converted into a DC voltage via a driving switch SW and a converter 12. A high-frequency wave is generated by an inverter 13 according to the DC voltage supplied from the converter 12.

The converter 12 is configured of two DC power sources 121, 122 which convert the AC voltage of the power source 11 into a DC voltage. Outputs of the DC power sources 121, 122 are mutually connected in series, and a total of the DC voltages of the DC power sources 121, 122 is supplied as an output DC voltage from the converter 12 to the inverter 13.

Reference numeral 14 denotes a dielectric barrier discharge lamp. The dielectric barrier discharge lamp 14 has an excimer-forming gas, xenon, sealed in a long tube-like airtight container 141 made of, for example, quartz glass having ultraviolet transmission properties. Besides, an inside electrode 142 is arranged along the entire area in the tube axis direction within the airtight container 141, and an outside electrode 143 is arranged in close contact with the external semicircular shape of the airtight container 141.

The dielectric barrier discharge lamp 14 can irradiate ultraviolet rays by inducing a dielectric barrier discharge according to the high-frequency wave generated by the inverter 13.

Figure 2:
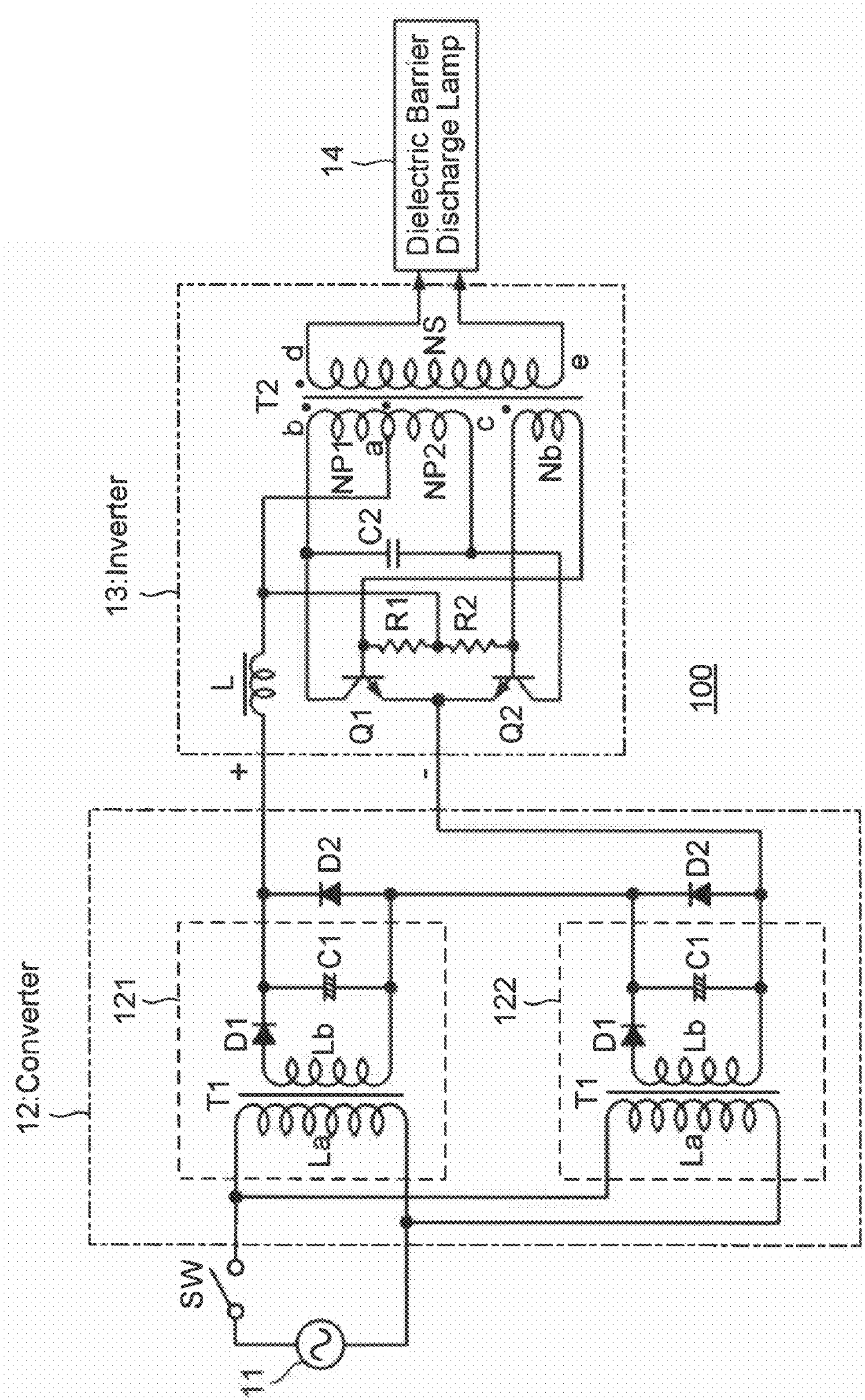
FIG. 2 is a circuit diagram for explaining a specific example of a lighting device for turning on the dielectric barrier discharge lamp of FIG. 1.
Figure 3:
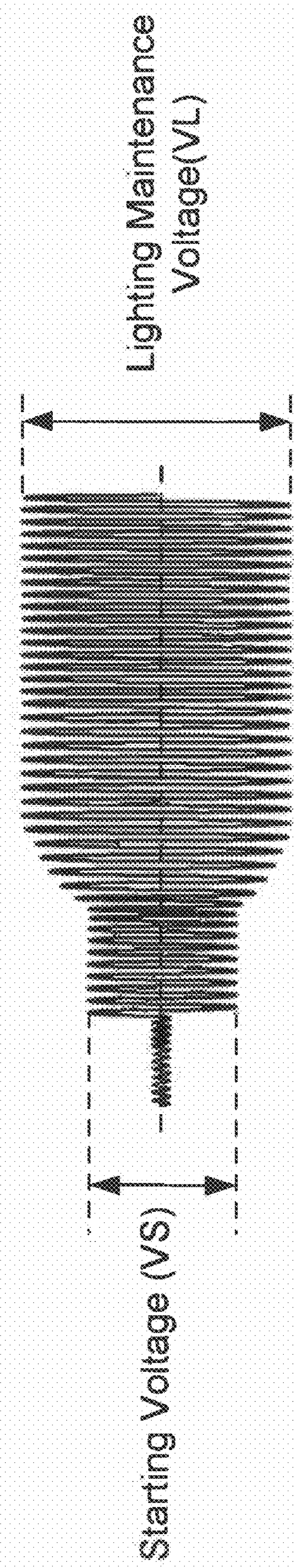
FIG. 3 is an explanatory view for explaining conditions for turning on the dielectric barrier discharge lamp of FIG. 1.

FIG. 2 is a circuit diagram for explaining a specific example of a lighting device which turns on the dielectric barrier discharge lamp, and FIG. 3 is an explanatory view for explaining an operation of FIG. 2.

In FIG. 2, the AC voltage of the power source 11 is supplied to primary coils LA of transformers T1 of the individual DC power sources 121, 122 via the switch SW. AC voltages corresponding to winding ratios to be taken from secondary coils Lb of the transformers T1 are generated. The AC voltages derived to the secondary coils of the individual transformers T1 are smoothed by rectifying diodes D1 and capacitors C1 and converted into DC voltages. The DC voltages outputted from the DC power sources 121, 122 are summed and supplied as the output from the converter 12 so as to be a power source for driving the inverter 13.

Diodes D2 for prevention of backflow of the illustrated polarity are connected to the outputs of the capacitors C1 of the DC power sources 121, 122. Thus, a disadvantage due to the occurrence of backflow because of a rising time difference between the series-connected DC power sources 121, 122 is prevented.

The inverter 13 is, for example, a self-excitation resonance type push-pull circuit and comprised of transistors Q1, Q2, an inductor L for constant current, starting resistors R1, R2, a transformer T2, a capacitor C2 and the like.

When the DC voltage is supplied from the converter 12, one of the transistors Q1, Q2 is conducted first because of variations in circuit constant and hfe (current amplification factor) of the transistors Q1, Q2. When it is assumed that the transistor Q1 has been conducted first, primary windings NP1, NP2 having an intermediate tap (a) of the transformer T2 generate a voltage which becomes minus on the side having a dot in the drawing. A voltage corresponding to the winding ratio of the primary windings NP1, NP2 and a base winding Nb is induced in the base winding Nb.

The induced voltage causes forward biasing between the base and emitter of the transistor Q1 to reach the saturation region quickly. Reverse biasing is caused between the base and emitter of the transistor Q2 to have a cut-off state. At this time, the current flows from the intermediate tap (a) between the primary windings NP1 and NP2 to the primary winding NP1, a collector of the transistor Q1 and an emitter (−). The intermediate tap (a) becomes positive, a point (b) of the primary winding NP1 becomes negative, and the input voltage is applied.

Meanwhile, the same voltage as that of the primary winding NP1 is induced between the intermediate tap (a) and a point (c) of the primary winding NP2. In the transformer T2, the point (c) of the primary winding NP2 becomes positive, the point (b) of the primary winding NP1 becomes negative, and this voltage is applied between the base and emitter of the transistor Q2.

By resonance between the capacitor C2 and the primary windings NP1, NP2 of the transformer T2, a resonant current flows from the point (c) via the capacitor C2 through a route of the point (b) and it is charged into the capacitor C2.

In a secondary winding NS of the transformer T2, a point (d) on the side having a dot mark becomes negative and its opposite point (e) becomes positive, the current flows from the point (b) toward the point (c), and the voltage and the current come to have the same phase as those of the capacitor C2. The dielectric barrier discharge lamp 14 which is a load is connected to the secondary winding NS of the transformer T2.

Thus, the transistors Q1, Q2 oscillate by repeating ON/OFF operations and perform at a high frequency oscillation, mainly a resonance frequency determined by the capacitor C1 for resonance and the transformer T2. The oscillation has a waveform close to a sinusoidal waveform.

The transformer T2 increases the voltage supplied to the primary windings NP1, NP2 to a level necessary to turn on the dielectric barrier discharge lamp 14, and outputs from the secondary winding NS side. When the high frequency and high voltage generated by the transformer T2 are applied to the dielectric barrier discharge lamp 14, they are applied between the positive and negative electrodes via the inside airtight container 141 to excite electric discharge gas, then fall in the excimer state, and when returning to a ground state, they generate vacuum-ultraviolet light, namely excimer light, or vacuum ultraviolet.

At this time, a lighting waveform is as shown in FIG. 3. Namely, when a starting voltage Vs and a lighting maintenance voltage VL are compared, Vs<VL is established, so that it becomes possible to start surely by designing the transformer T2 of the inverter 13 so that the lighting maintenance voltage VL can be assured.

Figure 4:
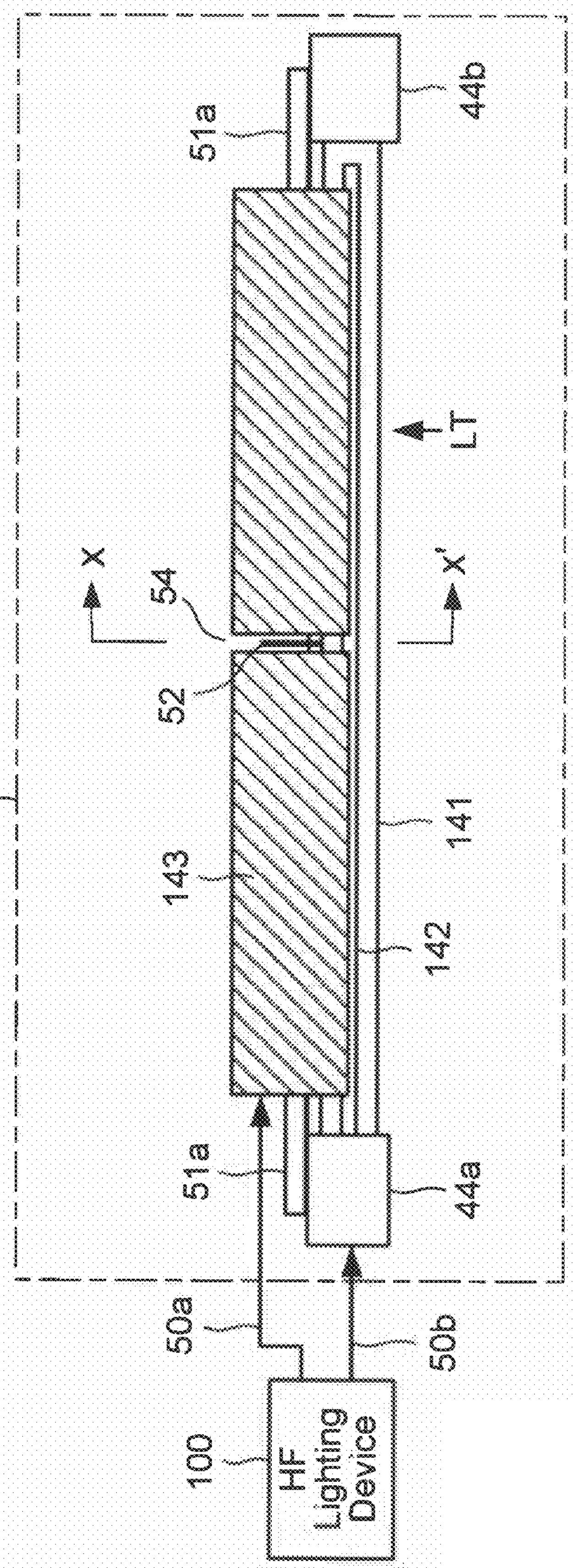
FIG. 4 is a configuration view for explaining more specifically the dielectric barrier discharge lamp of FIG. 1.
Figure 5:
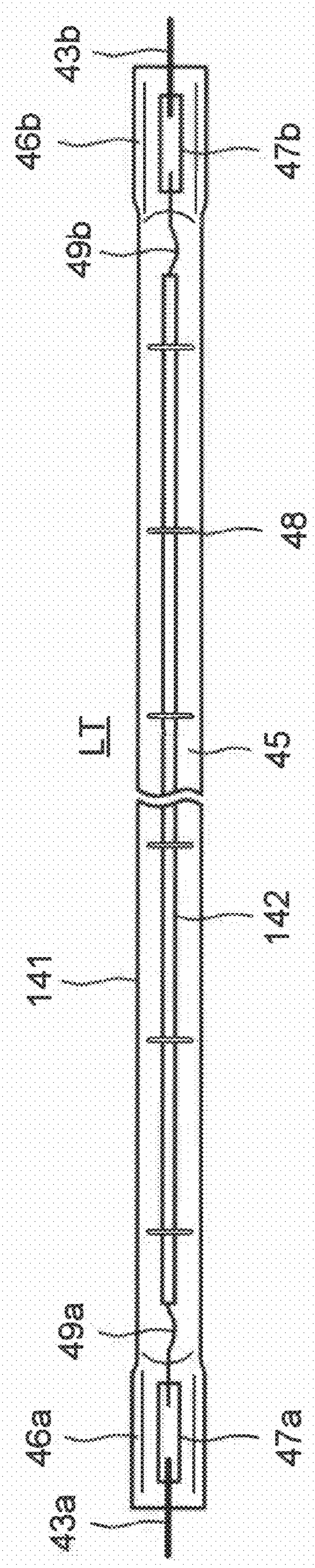
FIG. 5 is a configuration view for specifically explaining the main portion of FIG. 4.
Figure 6:
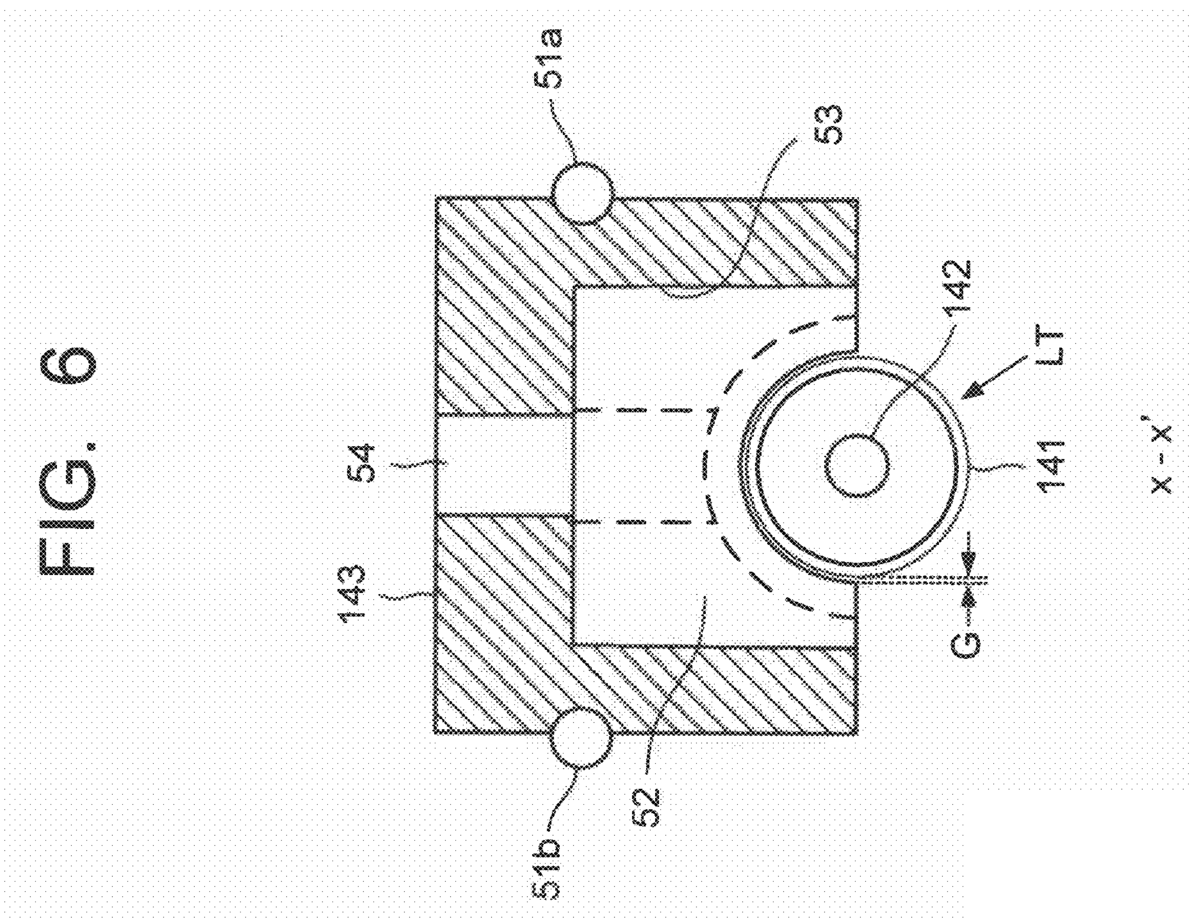
FIG. 6 is an x-x' sectional view of FIG. 4.

FIG. 4 to FIG. 6 explain more specifically the dielectric barrier discharge lamp which is turned on by the lighting device explained in FIG. 2, FIG. 4 is a configuration view, FIG. 5 is a configuration view for explaining specifically the main portion of FIG. 4, and FIG. 6 is an x-x' sectional view of FIG. 4.

LT denotes a luminous tube, which is provided with the airtight container 141, a conducting medium and the long inside electrode 142, and has power supply portions 43*a*, 43*b* and support portions 44*a*, 44*b* at both ends.

As shown in FIG. 5, the airtight container 141 is made of a material having ultraviolet transmission properties and provided with a long cylindrical hollow portion 45 having, for example, an outside diameter of 18 mm and an inside diameter of 16 mm and sealed portions 46*a*, 46*b* which are formed at both ends of the hollow portion 45 respectively, and its length is 1300 mm. The sealed portions 46*a*, 46*b* have a pinch-seal structure that molybdenum foils 47*a*, 47*b* are buried within them. Xenon is sealed as excimer-forming gas within the hollow portion 45 of the airtight container 141.

As shown in FIG. 5, the long inside electrode 142 is disposed within the airtight container 141 in a coaxial relationship with it and comprised of plural anchors 48 and inside leads 49*a*, 49*b*. The inside electrode 142 is mainly configured of a coil having, for example, an outside diameter of 1.2 mm which is formed by winding a thin metallic wire made of a tungsten wire having a wire diameter of 0.26 mm. The anchors 48 are arranged in plural at a prescribed interval of, for example, 15 mm in the inside electrode 142. The inside leads 49*a*, 49*b* are formed by extending both ends of the inside electrode 142. The inside electrode 142 has the inside leads 49*a*, 49*b* welded to one ends of the molybdenum foils 47*a*, 47*b* in the sealed portions 46*a*, 46*b* formed at both ends of the airtight container 141 in a state that a tension of about 2 kg is applied. The inside electrode 142 is extended by the action of tension in a state that it is mounted in the airtight container 141.

The power supply portions 43*a*, 43*b* each have a rod shape, their inside ends are welded to the molybdenum foils 47*a*, 47*b* which are buried within the sealed portions 46*a*, 46*b* which are formed at both ends of the airtight container 141, and their base ends are protruded from the sealed portions 46*a*, 46*b* formed at both ends of the airtight container 141 to outside tube axis directions. The power supply portions 43*a*, 43*b* are caulked for the connection to power supply lines 50*a*, 50*b* within the support portions 44*a*, 44*b* described later. The power supply lines 50*a*, 50*b* are extended from the output ends of a high-frequency lighting device 100.

The support portions 44*a*, 44*b* attach the luminous tube LT to positioning guides 51*a*, 51*b* shown in FIG. 4. The positioning guides 51*a*, 51*b* are extended from both ends of the outside electrode 143 in the tube axis direction in an end direction of the airtight container 141 to define the mounting position of the airtight container 141.

The outside electrode 143 is made of an aluminum block that its undersurface is formed into a concave circular curved surface to have a gutter shape and arranged to face the upper-half outside surface of the airtight container 141 with a gap G of 0.35±0.15 mm between them along almost the entire length of a region opposed to the inside electrode 142. A cutout groove 53 for housing a spacer 52 and an air intake port 54 are formed at the center of the outside electrode 143 in the tube axis direction. The cutout groove 53 is formed to intersect at right angles to the tube axis as shown in FIG. 4 and FIG. 6 and open to the undersurface of the outside electrode 143. The air intake port 54 is formed astride the cutout groove 53 and vertically through the outside electrode 143.

As shown in FIG. 4 and FIG. 6, the spacer 52 made of a stainless steel plate having a thickness of 3 mm is put in the cutout groove 53 of the outside electrode 143 by press fitting and its lower end is slightly protruded from the circular curved surface positioned at the undersurface of the outside electrode 143. Its protruded amount is determined to be a value such that the gap G between the outside electrode 143 and the airtight container 141 is not smaller than a prescribed separate distance. The spacer 52 and the airtight container 141 are slightly separated from each other in the drawing but may be contacted.

Since the air intake port 54 is formed astride the cutout groove 53, its bottom open end is divided to open on both sides of the spacer 52. Therefore, air on both sides of the spacer 52 is finely taken into the air intake port 54. The air exhausted out of the outside electrode 143 through the air intake port 54 is further discharged out of an ultraviolet irradiation apparatus through an exhaust duct. Therefore, even if the spacer 52 and the airtight container 141 are mutually rubbed to chip the spacer 52 resulting in producing fine particles, the particles are externally exhausted together with the surrounding air through the air intake port 54.

The high-frequency lighting device 100 applies a high-frequency voltage between the inside electrode 142 and the outside electrode 143 of the dielectric barrier discharge lamp 14 to turn on the dielectric barrier discharge lamp 14 by urging it and is comprised of the converter and the inverter of FIG. 2. The high-frequency outputs of the high-frequency lighting circuit 100 are connected between the outside electrode 143 and the pair of power supply portions 43$a$, 43$b$ of the luminous tube LT of the dielectric barrier discharge lamp 14 through the pair of power supply lines 50$a$, 50$b$.

One of the high-frequency output ends of the high-frequency lighting circuit 100 is connected to the pair of power supply portions 43$a$, 43$b$ derived from the inside electrode 142 of the dielectric barrier discharge lamp 14 to the outside through the power supply lines 50$a$, 50$b$, and the other is connected to one end of the outside electrode 143 through the power supply lines 50$a$, 50$b$. Therefore, when the power source 11 of the high-frequency lighting circuit 100 is turned on, a high frequency is generated, and the high-frequency output is applied between the inside electrode 142 and the outside electrode 143 which is opposed to it with the wall surface of the airtight container 141 between them, and a dielectric barrier discharge occurs within the airtight container 141. The dielectric barrier discharge causes to irradiate vacuum-ultraviolet light having a center wavelength of 172 nm by the xenon excimer. Since the vacuum-ultraviolet light is externally discharged through the wall surface of the airtight container 141, it can be used in accordance with individual objects.

Since the outside electrode 143 and the airtight container 141 are slightly separated from each other, no particles are produced at a portion of at least an effective length of the lamp even if the lamp repeats blinking, and even if particles are produced due to rubbing between the spacer and the airtight container, the produced amount of particles is quite small, and the particles are quickly discharged externally by an air intake means which discharges the particles quickly, so that a black color adhered matter is not produced.

In this embodiment, it becomes possible to secure an output voltage necessary to turn on a dielectric barrier discharge lamp having different specifications by connecting the DC power source in series the DC voltage of the converter, which is supplied to the inverter. Therefore, even when a dielectric barrier discharge lamp having different specifications is used, optimum luminous efficiency can be realized without designing newly. In other words, a dielectric barrier discharge lamp having different specifications can be turned on by using not a special DC power source but a ready-made DC power source (+24V, +48V).

Figure 7:
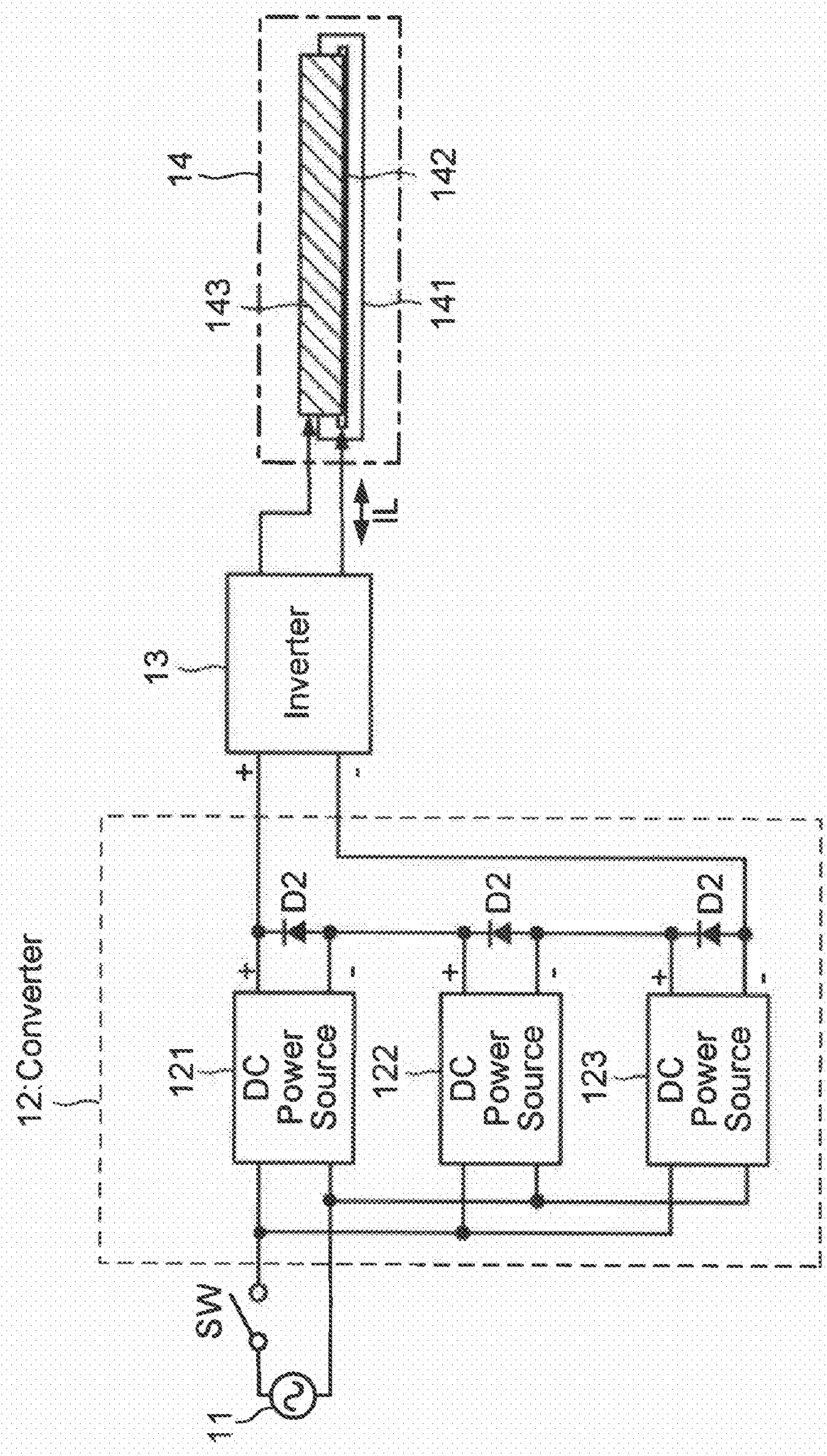
FIG. 7 is a conceptual configuration view for explaining a second embodiment of the dielectric barrier discharge lamp lighting device of the invention.

FIG. 7 is a conceptual configuration view for explaining a second embodiment of the dielectric barrier discharge lamp lighting device of the invention.

This embodiment shows an example that the number of the DC power sources of the converter 12 connected in series is changed to three, and the other structure is same as in FIG. 1 and therefore its description is omitted.

Specifically, the converter 12 is comprised of DC power sources 121 to 123 which supply an AC voltage to the power source 11. A positive output of the DC power source 121 is connected to a positive input of the inverter 13, a negative output is connected to a positive output of the DC power source 122, a negative output of the DC power source 122 is connected to a positive output of the DC power source 123, and a negative output of the DC power source 123 is connected to a negative input of the inverter 13.

Thus, the DC power sources 121 to 123 are connected in series and can be corresponded with a used lamp which is turned on at a higher lamp voltage in comparison with the dielectric barrier discharge lamp used in the embodiment of FIG. 1.

Figure 8:
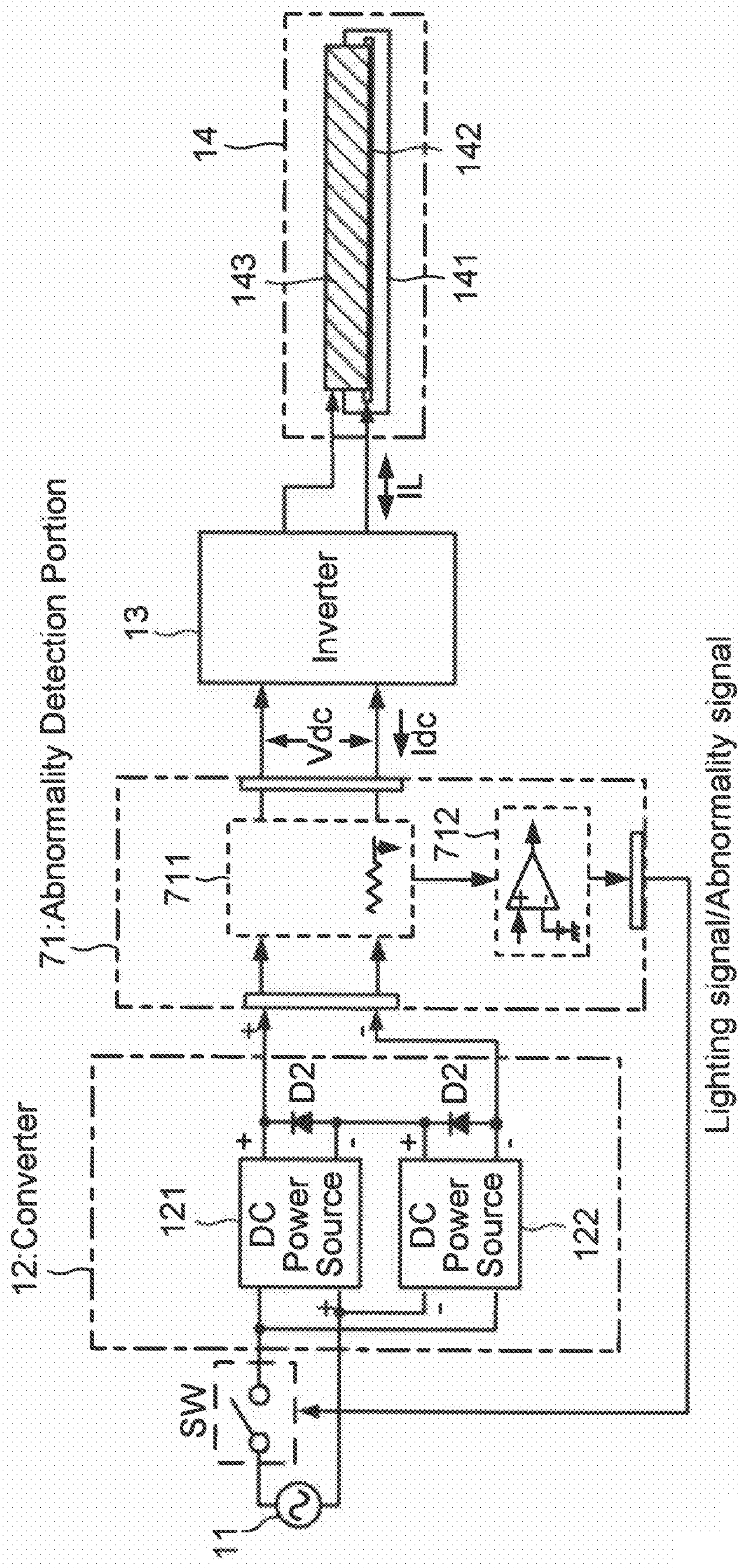
FIG. 8 is a conceptual configuration view for explaining a third embodiment of the dielectric barrier discharge lamp lighting device of the invention.
Figure 9:
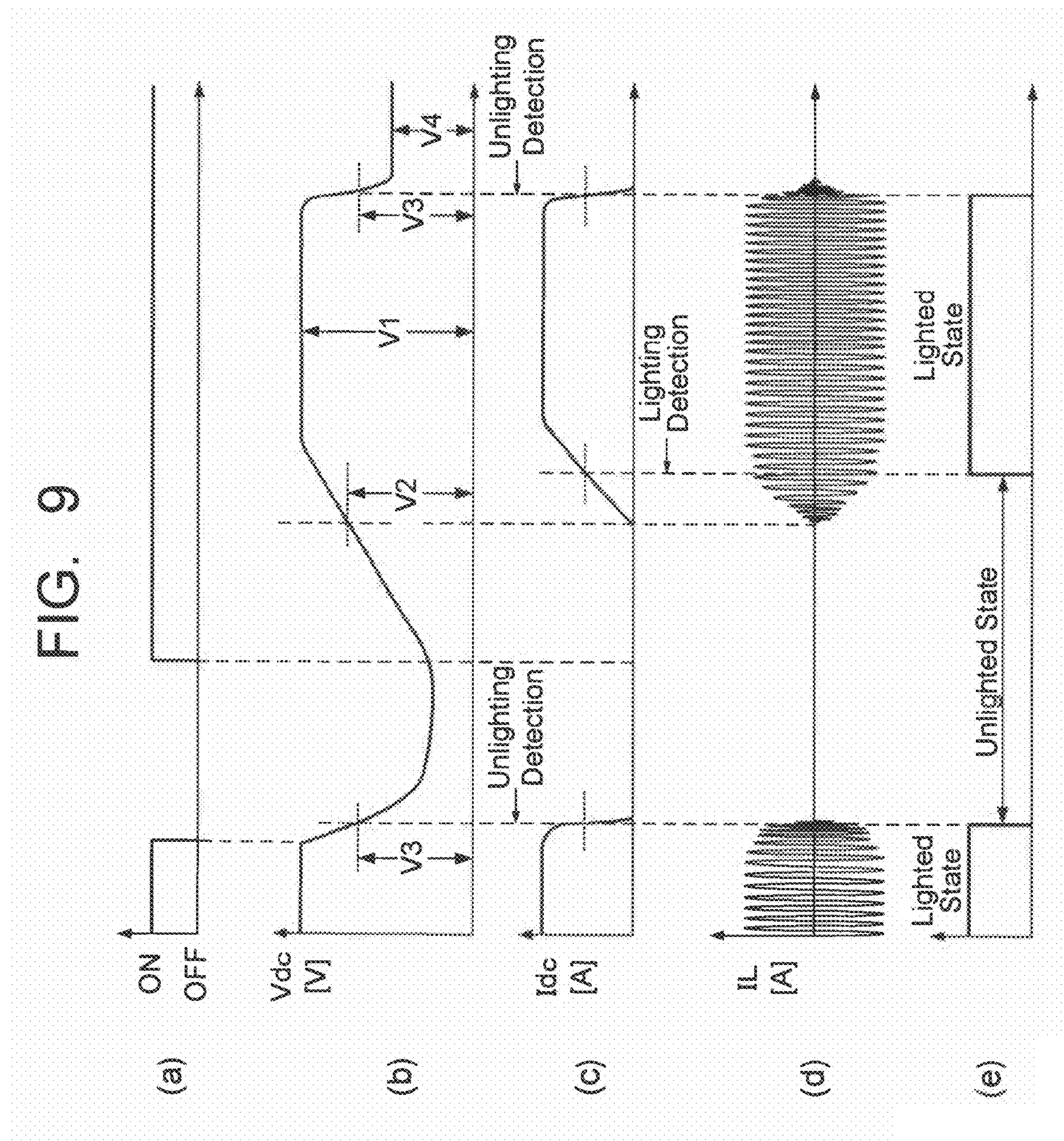
FIG. 9 is an explanatory view for explaining an action of FIG. 8.

FIG. 8 and FIG. 9 are diagrams for explaining a third embodiment of the dielectric barrier discharge lamp lighting device of the invention. FIG. 8 is a conceptual configuration view, and FIG. 9 is an explanatory view for explaining an operation of FIG. 8. Like component parts corresponding to those of the above-described embodiment are denoted by like reference numerals, and different portions only are described below.

In this embodiment, an abnormality detection portion 71 is disposed between the converter 12 and the inverter 13 to detect as abnormality in case of having, for example, a prescribed current value or below and to inform about the abnormality detection externally.

An example of the abnormality detection portion 71 is configured that a DC current sensor 711 is used to monitor the current between the converter 12 and the inverter 13, and an error amplifier 712 is used to output an abnormality signal if the current becomes a standard value or below.

Specifically, based on ON or OFF of the switch SW as shown (a) in FIG. 9, an output voltage Vdc shown (b) in FIG. 9 is supplied from the output of the converter 12 to the inverter 13 via the abnormality detection portion 71. When the value of the output voltage Vdc shown (b) in FIG. 9 is V1, it denotes a drive voltage of the inverter 13 when lighting is normal, and when V2, it denotes a drive start voltage of the inverter 13.

And, V3 shown (b) in FIG. 9 is a voltage (corresponding to the output voltage of the converter 12) supplied to the inverter 13 when the current value is detected as abnormality by the abnormality detection portion 71. Besides, V4 shown (b) in FIG. 9 is a voltage (corresponding to the output voltage of the converter 12) supplied to the inverter 13 when one of the DC power sources 121, 122 which configure the converter 12 stops outputting.

These voltage values V1 to V4 are determined to fall in a relationship of V4<V3<V2<V1. This condition defines a relationship of the output voltage of the converter 12 at individual operation points such as a stable lighted state, inverter driving—>lighting start, abnormal lighting detection, DC power source stop.

Specifically, since a relationship between a voltage V2 at which the inverter 13 starts driving and a voltage V1 supplied to the inverter 13 is V2<V1, the converter 12 can meet the condition of driving the inverter 13 without fail.

Since a relationship among the voltage V3 and the voltages V1, V2 is V3<V2<V1 when having a current value that abnormality is detected, a malfunction such as an output of an abnormality signal when the dielectric barrier discharge lamp 14 is lighted normally is not caused. And, there is no occurrence of a malfunction such as output of an abnormality signal just after driving the inverter 13.

Since a relationship among voltages V4, V2, V3 is V4<V3<V2 when one of the plural DC power sources stops, abnormality can be detected without fail even if the converter 12 malfunctions. It is seen that the inverter 13 cannot be driven under a condition that merely one of the DC power sources stops outputting.

The (c) in FIG. 9 shows an output current Idc of the inverter 13, the (d) in FIG. 9 shows a lamp current IL flowing to the dielectric barrier discharge lamp 14 based on a driving state of the inverter 13, and the (e) in FIG. 9 shows lighted and unlighted states of the dielectric barrier discharge lamp 14.

Thus, the relationship between the output voltage of the converter 12 at individual operation points such as a stable lighted state, inverter driving, abnormal lighting detection and DC power source stop and the output current monitored by the abnormality detection portion 71 is defined as shown (a) to (e) in FIG. 9. Thus, it becomes possible to avoid a malfunction and to perform lighting without fail and detection of abnormality.

Figure 10:
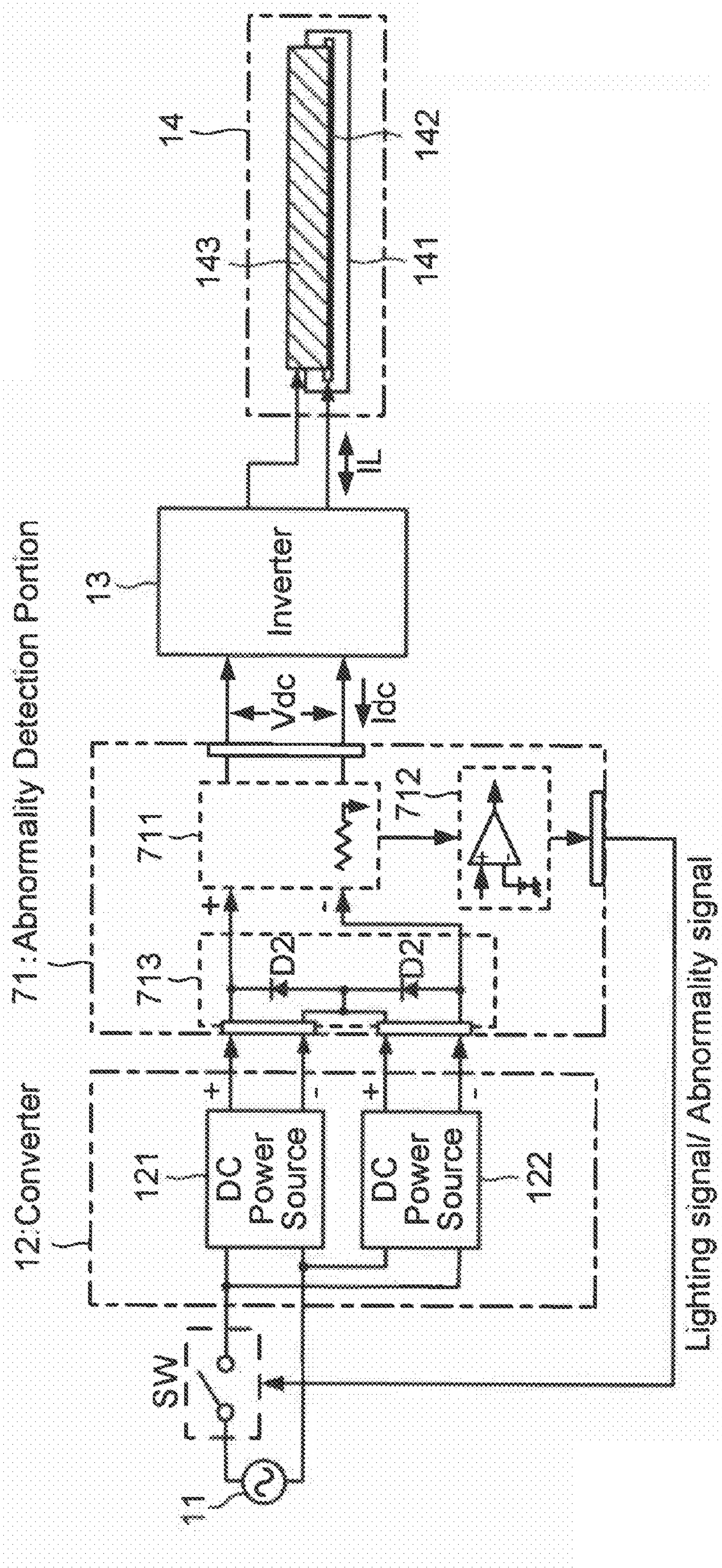
FIG. 10 is a conceptual configuration view for explaining a fourth embodiment of the dielectric barrier discharge lamp lighting device of the invention.

FIG. 10 is a conceptual configuration view for explaining a fourth embodiment of a dielectric barrier discharge lamp lighting device of the invention. For description, like component parts corresponding to those of FIG. 8 are denoted by like reference numerals.

This embodiment configures a combining portion 713 which is comprised of the diodes D2 for preventing a backward flow between the DC power sources 121, 122 with the outputs of the DC power sources 121, 122 of the converter 12 connected to the abnormality detection portion 71 as they are to connect the DC power sources 121, 122 in series to the abnormality detection portion 71.

This embodiment configures the combining portion 713 within the abnormality detection portion 71, so that the individual DC power sources 121, 122 configuring the converter 12 can be used without modifying by, for example, connecting a backward flow-preventing diode to a commercially available power source.

In this embodiment, the DC power sources of the converter 12 are not limited to two but may be more. The number of the DC power sources can be adjusted according to the specifications of the dielectric barrier discharge lamp.

What is claimed is:

1. A dielectric barrier discharge lamp lighting device, comprising:

a dielectric barrier discharge lamp which has an inside electrode arranged in a tube axis direction within an airtight container having a long tube shape with ultraviolet transmission properties, an outside electrode having a semicircular shape arranged outside of the airtight container in close contact with it, and an excimer-forming gas sealed within the airtight container;

a converter which converts an AC voltage supplied from a commercial power source into a DC voltage and outputs it; and an inverter which generates a high frequency based on the DC voltage supplied from the converter, causes the dielectric barrier discharge lamp to induce a dielectric barrier discharge by the high frequency and irradiates ultraviolet rays, wherein the converter is configured of at least two DC power sources whose outputs are connected in series.

2. The dielectric barrier discharge lamp lighting device according to claim 1, further comprising an abnormality detection portion which has a current detection portion provided between the converter and the inverter, detects as abnormality when current has a prescribed current value or below and outputs a signal externally.

3. The dielectric barrier discharge lamp lighting device according to claim 2, wherein when an input voltage of the inverter is denoted as V1, a drive start voltage of the inverter is denoted as V2, an input voltage of the inverter at a time of having a current value to output an abnormality signal externally at the abnormality detection portion is denoted as V3, and an input voltage of the inverter when at least one among at least the DC power sources configuring the converter stops outputting is denoted as V4, the V1 to V4 are in a relationship of V4<V3<V2<V1.

4. The dielectric barrier discharge lamp lighting device according to any of claims 1 through 3, wherein a diode for prevention of a backward flow is connected to output ends of the individual DC power sources of the converter.

5. The dielectric barrier discharge lamp lighting device according to any of claims 1 through 3, wherein a diode for prevention of a backward flow is connected to positions that become output ends of the individual DC power sources within the abnormality detection portion to which the outputs of the individual DC power sources of the converter are supplied.

* * * * *